(No Model.)

H. B. SMITH & W. S. KELLEY.
MANUFACTURE OF METAL FELLIES.

No. 358,494. Patented Mar. 1, 1887.

WITNESSES
Sidney P. Hollingsworth
W. H. Shipley

INVENTOR
H. B. Smith
W. S. Kelley
By P. T. Dodge, Attorney

UNITED STATES PATENT OFFICE.

HEZEKIAH B. SMITH AND WILLIAM S. KELLEY, OF SMITHVILLE, N. J.

MANUFACTURE OF METAL FELLIES.

SPECIFICATION forming part of Letters Patent No. 358,494, dated March 1, 1887.

Application filed May 9, 1885. Serial No. 164,944. (No model.)

*To all whom it may concern:*

Be it known that we, HEZEKIAH B. SMITH and WILLIAM S. KELLEY, of Smithville, in the county of Burlington and State of New Jersey, have invented certain Improvements in Metallic Fellies and Method of Manufacturing the Same, of which the following is a specification.

Our invention relates, particularly, to the manufacture of those thin elastic externally-grooved rims or fellies such as are used in connection with bicycles and similar vehicles.

The aim of the invention is to manufacture speedily and cheaply tires of uniform size and strength throughout their entire length; and to this end it consists, generally speaking, in the method consisting in preparing an endless band or hoop of metal and subjecting the same to a rolling operation whereby it is expanded in diameter and changed in cross-section until a finished elastic tire results. The ring or blank is introduced to the rolls in a highly-heated condition, and the rolling is continued until the tire is cold, or practically so, the effect of which is to give it a high finish and that peculiar hardness and elasticity which attends the ordinary process of hammer-hardening.

We are aware that tires for railway-wheels have been forged and rolled from an endless blank or ring while in a heated condition into substantially the required form, the rolling operation being completed while the metal is in a heated condition, and the blank delivered in such condition that it is required to be turned or otherwise finished for use. We are also aware that a metallic bar of U-section has been bent into a circular form by means of rollers pressing the same into the periphery of a grooved wheel or form, the bar thus formed being united at its ends and finished in an ordinary manner, and to such machines and modes of manufacture we lay no claim.

Figure 1:
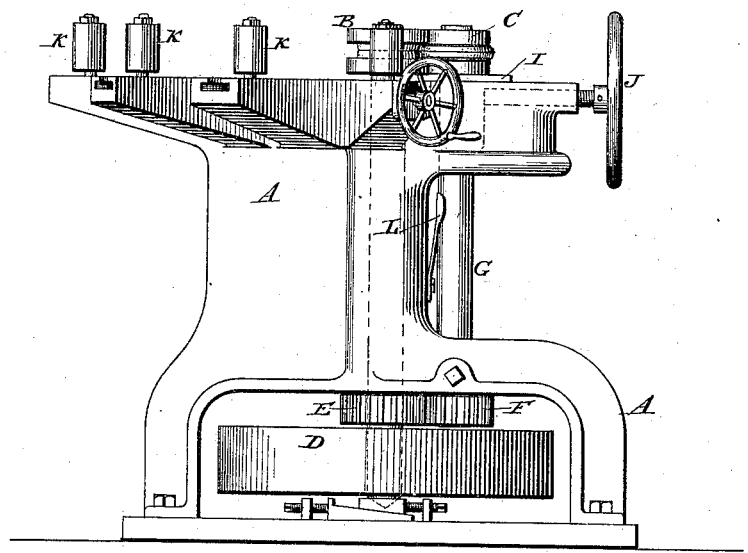
Figure 2:
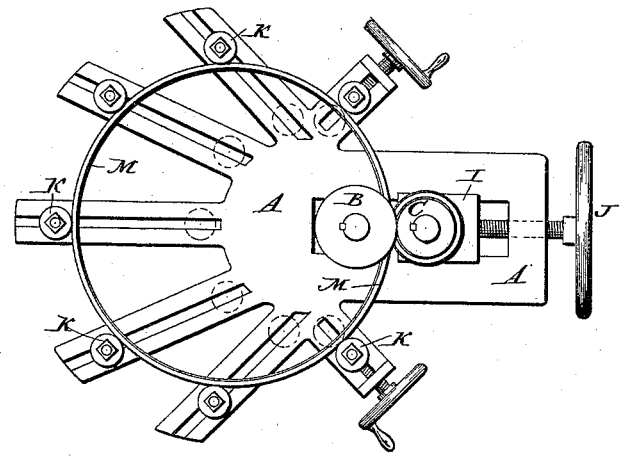
Figure 3:
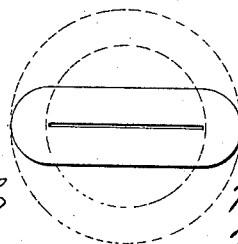

In the accompanying drawings, Figure 1 represents a side elevation of a machine adapted for carrying our invention into effect; Fig. 2, a top plan view of the same; Fig. 3, a view illustrating the formation of the annular blank.

A represents the frame-work of the machine presenting a flat upper surface with radially-grooved arms.

B represents a horizontal peripherally-grooved roll mounted on the upper end of a vertical shaft.

C represents a complementary roll having a peripheral flange.

The groove of roll B and the flange of roll C give form, respectively, to the interior and exterior of the tire. The shaft of the roller B is fixed in the main frame and provided at its lower end with a driving-pulley, D. It is also provided with a pinion, E, which communicates motion to a pinion, F, fixed in the lower end of the shaft G, which carries the roll C. The lower end of the shaft G is sustained by horizontal pivots in order to admit of the roller C being adjusted to and from its companion. The upper end of the shaft G is seated in a sliding box, I, which is adjusted by means of a hand-screw, J. The series of rollers K are mounted on vertical pivots secured adjustably in the horizontally-slotted arms of the main frame. These rollers are designed to bear against the periphery of the tire, and they are adjustable in order to adapt the machine for producing tires of different sizes.

In commencing operation we provide a blank, as represented in Fig. 3, by forming a slit in a bar of metal and expanding the same to an annular form, or by bending a bar into annular form and welding its ends together. This blank is made of a diameter much less and of a cross-section much greater than that required in the finished tire. This blank rim is introduced in a properly-heated condition into the machine and the rolling operation continued until the blank is increased in diameter, changed in cross-section to the desired form, and given a hardness and elasticity similar to that produced by what is commonly known in the art as "hammer-hardening." The resulting product is a tire of high finish and of uniform size, strength, and temper throughout its entire length. It is distinguishable by the eye from all other grooved tires, first, by reason of its general appearance and finish, and, second, by the absence of any joint or weld therein.

By the expression "weldless tire," as herein employed, is meant a tire which is rolled and finished complete from an endless blank.

Having thus described our invention, what we claim is—

1. The herein-described method of forming grooved rims or fellies for bicycle and other wheels, consisting in rolling an endless heated blank between rolls provided with suitable grooves until the metal assumes the completed form and acquires a spring temper.

2. As an improvement in the art of forming metal rims or fellies for wheels, the method consisting in inserting an endless heated blank between suitable grooved rolls, continuing the rolling action thereon until the blank has assumed the desired form and size and becomes reduced in temperature, so that it acquires a hardened or tempered condition analogous to hammer-hardening.

3. As a new article of manufacture, a weldless elastic grooved tire or rim.

4. As a new article of manufacture, a continuous grooved weldless rolled metallic rim or felly.

In testimony whereof we hereunto set our hands in the presence of two attesting witnesses.

HEZEKIAH B. SMITH.
WILLIAM S. KELLEY.

Witnesses:
E. F. BURNS,
E. H. BURTIS.